United States Patent [19]

Hofelt et al.

[11] 3,793,598

[45] Feb. 19, 1974

[54] DELAY LINE AND FILTER COMPRISING MAGNETIZABLE CRYSTALLINE MATERIAL HAVING PERIODIC STRUCTURE OF CYLINDRICAL MAGNETIC DOMAINS

[75] Inventors: Maarten Hector Hendrik Hofelt; Willem Frederik Druyvesteyn, both of Emmasingel, Eindhoven, Netherlands

[73] Assignee: U.S. Philips Corporation, New York, N.Y.

[22] Filed: Mar. 15, 1973

[21] Appl. No.: 341,465

[30] Foreign Application Priority Data

Apr. 7, 1972 Netherlands .......................... 7204639

[52] U.S. Cl. .................................. 333/30 M, 333/71

[51] Int. Cl. ........ H03h 9/22, H03h 9/30, H03h 9/34

[58] Field of Search 333/30 M, 71, 72; 340/174 VB

[56] References Cited

UNITED STATES PATENTS 3,138,789 6/1964 Pugh ............................ 333/30 M.X

*Primary Examiner*—Paul L. Gensler
*Attorney, Agent, or Firm*—Frank R. Trifari; Carl P. Steinhauser

[57] ABSTRACT

A device for the processing of signals, comprising a wafer of a magnetic material with a lattice of cylindrical magnetic domains located in a magnetic field, which wafer is provided with a transmitter and a sensor. Signals on the transmitter and on the sensor have a time delay relative to each other. The delay time is continuously variable by varying the strength of the magnetic field. An alternative application as a tunable frequency filter is possible.

8 Claims, 6 Drawing Figures

DELAY LINE AND FILTER COMPRISING MAGNETIZABLE CRYSTALLINE MATERIAL HAVING PERIODIC STRUCTURE OF CYLINDRICAL MAGNETIC DOMAINS

The invention relates to a device for the processing of signals, comprising a control body of crystalline material provided with an input signal converter and an output signal converter, and a device for causing a uniform magnetic field of variable strength to act upon the body.

A device of the above-mentioned type is described in a paper in the Journal of Applied Physics, Vol. 39, no. 3, Feb. 15 1968, pages 1,828–1,839, which paper relates to magneto-elastic delay lines. The operation of the device described in said article is based on the fact that in an axially magnetized rod of monocrystalline yttrium-iron-garnet incoming electromagnetic energy is coupled to magneto-elastic energy. According to the theoretical model this coupling can be achieved via magnetostatic and spin-wave energy, the velocity of propagation of the spin-waves in the crystal being a function of the applied magnetic field. Hence, the time required by the spin-waves to propagate in the crystal (the delay time) can be varied by varying the magnetic field strength. Delay times up to 6 microseconds at a frequency of 1–2 GHz would be possible. However, the attainable variation is relatively small, for example, 0.75 microseconds at a frequency of 2 GHz, while a frequency dependence occurs of 3 nanoseconds over 200 MHz. Further drawbacks are the relatively great losses (to be distinguished into propagation losses and coupling losses) which may amount to 30 to 40 dB: the fact that the dispersion relation is non-linear, for example, at a delay time of 1 microsecond the dispersion is 2 nanoseconds /MHz and at 5 microseconds the dispersion is 7 nanoseconds/MHz; the fact that a special magnetic field profile should be realized in the crystal in order that spin waves can be excited; the fact that spin-waves will exhibit a non-linear behavior at low energy levels already; and the fact that such a delay line operates only at very high frequencies (in the GHz-region).

It is an object of the invention to provide a new device for the processing of electromagnetic signals which, in particular, can function as a delay line whose delay time is adjustable by means of a magnetic field, but which is not subject to said drawbacks.

To this end the device for processing electromagnetic signals according to the invention is characterized in that the central body of crystalline material consists of a plate of magnetisable material with an easy axis of magnetisation which is substantially perpendicular to the plane of the plate, which plate can carry a periodic structure of cylindrical magnetic domains whose direction of magnetisation is opposite to the direction of magnetisation of the rest of the plate, the input signal converter being destined to convert an input signal into a magnetic signal and the output signal converter being destined to re-convert the magnetic signal into an output signal, and the device for causing a magnetic field to act upon the body being destined to produce a field of variable strength whose direction substantially coincides with the easy axis of magnetisation of the material of the plate.

How a periodic structure (lattice) of cylindrical magnetic domains can be produced in thin plates of materials as mentioned above, is described in I.E.E.E. Transactions on Magnetics, 1971 Vol., Mag. 7. No. 3, pages 355–358.

The invention is based on the discovery that such lattices can exhibit elastic wave phenomena. This means that the forces maintaining the configuration of equilibrium of the system of magnetic domains may be interpreted as "elastic" forces which can be derived from an "elastic" energy. A variation of the elastic state is attended by kinetic energy (deformation energy) which arises from the mass to be contributed to the domain walls. These elastic and kinetic energy contributions may give rise to the occurrence of elastic wave phenomena in such lattices, provided that the effects associated with the coercive field and with friction, such as domain wall damping, are small. It should be emphasized that said "elastic" phenomena should in the first instance be associated with variations of the local magnetisation. As is to be explained further, a low velocity of propagation is inherent to said wave phenomena, which makes the application of magnetic domain lattices as delay lines very attractive. Said velocity of propagation depends on the field applied in the direction of the easy axis of magnetisation, so that the delay time is adjustable by varying the strength of this field.

If a signal is applied to the domain lattice plate which has a frequency corresponding to a dimensional resonance frequency, or alternatively, which has a wavelength which exactly "fits" the dimensions of the domain lattice, a filter action will occur as well.

According to a further aspect the device according to the invention is consequently characterized in that the plate of magnetisable material is designed so that a dimensional resonance frequency is imposed on the wave phenomena which can be produced in the periodic structure of cylindrical magnetic domains.

According to yet another aspect the device according to the invention is characterized in that the plate of magnetisable material is designed so that a radial resonance frequency is imposed on the wave phenomena which can be produced in the periodic structure of cylindrical magnetic domains.

As will be explained further, a desired filter frequency can be obtained by adjusting the strength of the external magnetic field when employing a magnetic domain lattice as a frequency filter.

It is to be noted that microwave filters which can be tuned magnetically are known per se, for example from I.E.E.E. Transactions on Magnetics, September, 1969, page 481. The operation of these known filters is based on the dimensional resonance frequency of electromagnetic waves in matter (for example spheres or cylinders of polycrystalline YIG). A shift of the filter frequency of 15% over the X-band is then possible by varying the external field from 0 to 600 Oe, so that the permeability of the material and thus the "fitting" wave-length changes.

As is to be explained further on, a frequency filter according to the invention has the advantage that with the same dimensions as those of the known filter, it is possible to operate with frequencies which are 10 to 100 $x$ as low because the velocity of propagation of the elastic wave phenomena in a magnetic domain lattice is 1 to 2 orders of magnitude smaller than the velocity of propagation of electro-magnetic waves in ferrites bodies.

The invention will now be described, by way of example, with reference to the drawings.

Figure 1:
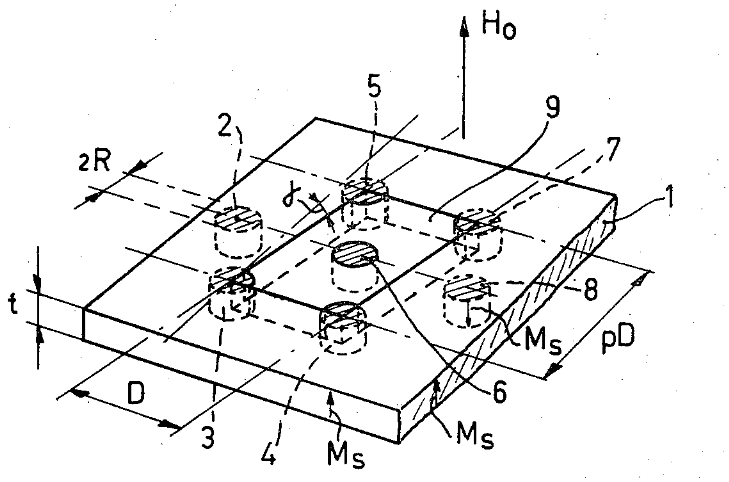
FIG. 1 shows a thin wafer of ferromagnetic material containing a so-called "bubble" lattice.

FIG. 1 shows a monocrystalline wafer 1 with a periodic structure of cylindrical magnetic domains 2, 3, 4, 5, 6, 7, 8 (hence forth to be called "bubbles"). The two dimensional "bubble" lattice is characterized by the unit cell 9 which contains two "bubbles" (i.e. "bubble" 6 plus one-quarter each of "bubbles" 3, 4, 5 and 7). Inside the "bubbles" the saturation magnetisation $M_s$ is oriented opposite to the external field $H_o$ and outside the "bubbles" the magnetisation is parallel to $H_o$. The dimensions of the cell in the plane of the wafer are D and pD, respectively, and the thickness of the wafer is $t$. It is assumed that the "bubbles" are circular-cylindrical with a radius R. Introduced are furthermore the shear angle $\gamma$, the dimensionless variables, $k = 2R/D$, $s = D/t$ and $h = H_o 14\pi M_s$. The periodic structure with $\gamma = 0$ and $p = \sqrt{3}$ is called a triangular lattice and is analogous to the three-dimensional hexagonal lattice.

A "bubble" lattice can, for example, be formed by "shaking" the magnetic structure of a wafer of a suitable material (for example Yb-orthoferrite or Gd-garnet) with the aid of a current loop (current density 100 amps, pulse width 3 microseconds and repetition frequency 50 Hz) and then gradually moving the loop away from the wafer. In the area of the wafer where the strength of the pulse field no longer suffices to "shake" the magnetic structure a regular "bubble" structure is left.

The difference in magnetic energy density between a "bubble" lattice in the equilibrium situation and in a deformed condition may be interpreted as an elastic energy density. In the case of the triangular lattice there are only two independent elastic constants, $C_{11}$ and $C_{12}$ on the basis of symmetry. The further relevant constant $C_{66}$ (the shear modulus) depends on these ($C_{66} = (C_{11} - C_{12})/2$). Thus, a compression modulus K, Young's modulus E and a Poissons ratio $\sigma$ can be derived:

$$K = (C_{11} + C_{12})/2$$

$$E = (C_{11} + C_{12})\ (C_{11} - C_{12})/C_{11}$$

$$\sigma = C_{12}/C_{11}.$$

The constants $C_{11}$, $C_{66}$, $K$, $E$ and $\sigma$ of different triangular "bubble" lattices have been computed numerically for the usual $1/t$ value of 0.25 (t is the thickness of the wafer, $1 = \sigma w/4\pi M^2$ is a characteristic material parameter with the dimensions of length, $\sigma_w$ is the surface energy density of the domain wall).

Figure 2:
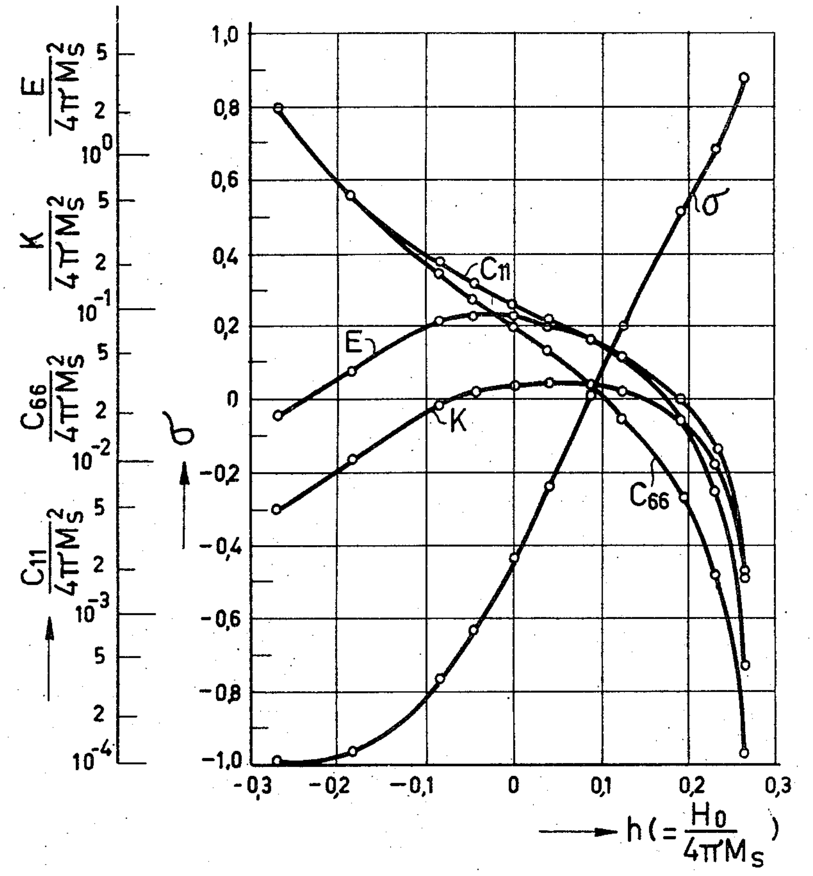
FIG. 2 shows a graph which represents the calculated relation between a number of elastic constants and the field strength.

In FIG. 2 the results of the calculation are plotted as a function of the reduced field strength $h$. It follows from this that, as is to be expected, the interaction energy which is responsible for the elastic behaviour, decreases as the "bubbles" grow smaller and their mutual distance increases.

Figure 3:
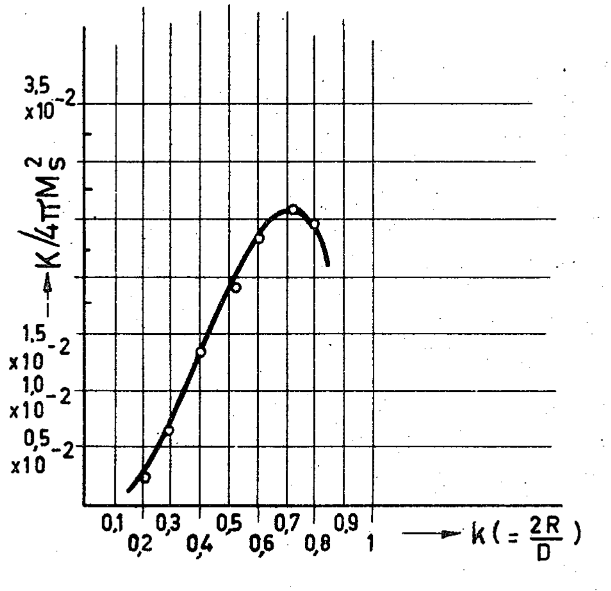
FIG. 3 shows a graph indicating the measured relation between the compression modules K and the variable $k$.

To illustrate the elastic behaviour the compression modules K measured on a "bubble" lattice is plotted in FIG. 3 as a function of the variable $k = 2R/D$. The material was a wafer having a thickness of 40 $\mu$ and a ratio $1/t = 0.02$ cut from a single crystal of the composition $Gd_{2.32}\ Tb_{0.59}\ Eu_{0.09}\ Fe_5O_{12}$.

Elastic wave phenomena may now be considered on the basis of the elastic behaviour. Starting point is the equation of motion for a volume element of the "bubble" lattice in a quasi static continuum approximation. It is assumed that the occurring wavelengths are substantially greater than the distances in the "bubble" lattice ($\lambda > D$) and that the coercive field of the domain wall may be neglected.

The equation of motion is: $\rho\ddot{u} + f\,\dot{u} - F_{el} = F$, in which $\rho$ is the density, f the friction coefficient, $F_{el}$ the elastic forces, $F$ the external forces and $u$ the displacement vector.

Under certain assumptions the velocities of propagation for the longitudinal and transverse modes, $C_l$ and $C_t$, respectively, can now be derived.

$$C_l = \sqrt{C_{11}/\rho}$$

$$C_t = \sqrt{C_{66}/\rho}$$

The reference velocity is defined as $C_w$ ($C_w = 2v \sqrt{2\pi A}$), $v$ is the gyromagnetic ratio of the material and A is the exchange energy per unit of length. $C_l$ and $C_t$ can be expressed in $C_w$:

$$C_l = C_w/2 \sqrt{ps/K \cdot t/1 \cdot C_{11}/4\pi M_s^2}$$

$$C_t = C_w/2 \sqrt{ps/K \cdot t/1 \cdot C_{66}/4\pi M_s^2}$$

Figure 4:
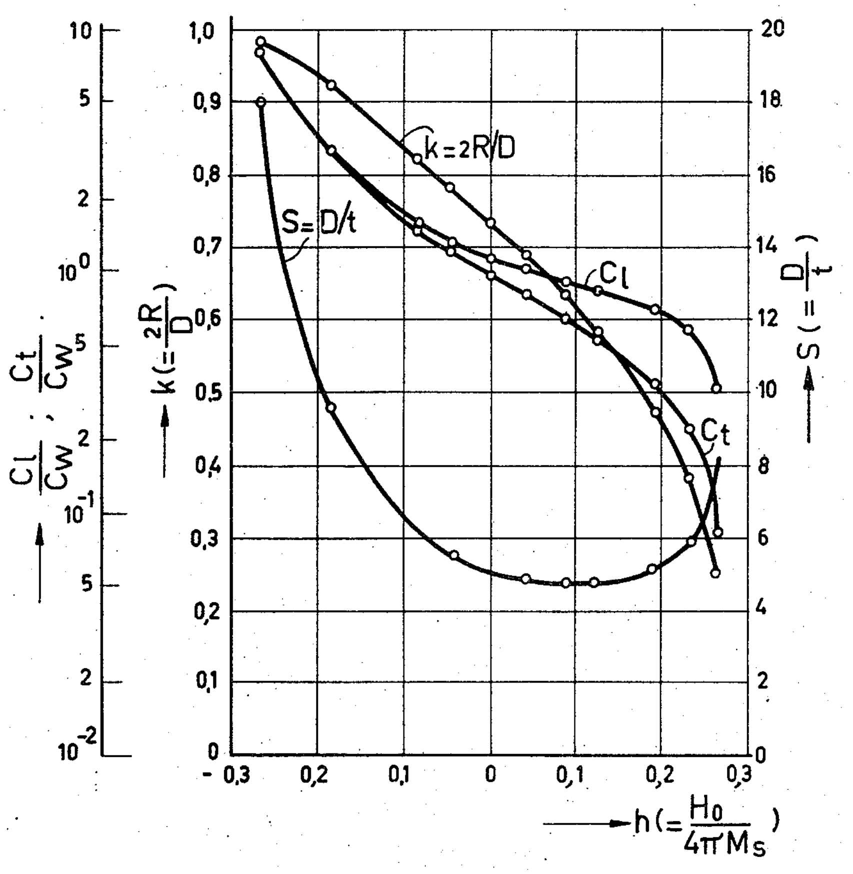
FIG. 4 is a graph showing the calculated relation between the velocity of propagation of various vibration modes and the field strength.

$C_l$ and $C_t$, in terms of $C_w$ have been calculated for different stable, triangular lattices. The results are plotted in FIG. 4 as a function of the reduced field strength $h$. Also plotted are $s = D/t$ and $k = 2R/D$ as a function of $h$.

In a finite wafer of "bubble" material standing waves can be produced having a wavelength $\lambda = 2\pi/|k|$ which is defined by the effective dimensions of the "bubble" lattice. The system then exhibits a dimensional resonance. The quality factor Q of the material is then expressed as $Q = (k^2 \pi C)\ /f$, in which $k$ is the wave vector and $C$ stands for $C_{11}$ or $C_{66}$, depending on whether a longitudinal or a transverse wave is considered.

The order of magnitude of the quality factor Q is found by expressing Q as an equation in which certain relations between the damping coefficient $f$ and the wall mobility $\mu$ as well as a certain relation between the surface energy density of the domain wall $\sigma_w$ and the anisotropy constant $K_u$ are included:

$$Q = \mu\ (\sqrt{K_u}/2\ v\ \lambda\ M_s) \cdot (2\pi pstC/1k)^{1/2}$$

The first member of this expression only depends on the material properties, whereas the second member is completely defined by the general lattice parameters.

For $1/t = 0.25$; $k \approx 0.5$; $s \approx 5$ the quality factor is approximated by $$Q \approx 10^{-7}\ \mu \sqrt{K_u}/\ \lambda\ M_s$$

For a "bubble" lattice in a wafer of rare-earth orthoferrite ($K_u \approx 10^6$ erg/cm$^3$ ; $4\pi M_s \approx 100$ Gauss ; $\mu \approx 10^4$ cm/sec Oe) this means that the quality factor $q > 1$ at a wavelength $\lambda = 1$ mm The reference velocity $C_w$ is then: $C_w \approx 440$ m/sec. It follows:

140 m/sec $< C_1 <$ 3,500 m/sec 38 m/sec $< C_t <$ 3,500 m/sec (Cf. FIG. 3)

The delay time $\tau$ per mm is then 0.3 microsec/mm $< \tau_l <$ 7 microsec/mm 0.3 microsec/mm $< \tau_t <$ 26 microsec/mm In other words, when using "bubble" lattices as delay lines the control range is very large.

A maximum frequency occurs at a wavelength which is of the order of magnitude of the lattice distance D:

$$f_{max} = C_{l,t}/\lambda_{\ min} = C_{l,t}/\ 2D.$$

When introducing a reference frequency $f_w = C_w/21$ , $f_{max}$ can be expressed as follows:

$$f_{l,t\max}/f_w = C_{l,t}/C_w/D/1$$

The following table gives a number of values which have been calculated at certain values of the reduced field strength $h$ ($1/t = 0.25$):

| $h$ | $C_1/C_w$ | $C_t/C_w$ | D/1 | $f_l/f_w$ | $f_t/f_w$ | $f_r/f_w$ |
|---|---|---|---|---|---|---|
| +0.2625 | 0.32 | 0.08 | 33.84 | $0.9 \times 10^{-2}$ | $0.24 \times 10^{-2}$ | $0.8 \times 10^{-2}$ |
| +0.2303 | 0.55 | 0.22 | 23.56 | 2.3 | 0.93 | 0.9 |
| +0.1918 | 0.67 | 0.31 | 20.40 | 3.4 | 1.52 | 1.06 |
| +0.1247 | 0.81 | 0.51 | 18.88 | 4.3 | 2.71 | 1.23 |
| +0.0873 | 0.88 | 0.62 | 18.84 | 4.7 | 3.29 | 1.32 |
| +0.0398 | 1.00 | 0.79 | 19.40 | 5.1 | 4.07 | 1.37 |
| +0.0002 | 1.12 | 0.95 | 20.32 | 5.5 | 4.68 | 1.42 |
| −0.0463 | 1.32 | 1.20 | 22.08 | 6.0 | 5.42 | 1.46 |
| −0.0853 | 1.58 | 1.48 | 24.36 | 6.5 | 6.06 | 1.48 |
| −0.1855 | 3.16 | 3.14 | 38.44 | 8.2 | 8.16 | 1.54 |
| −0.2697 | 7.89 | 7.97 | 72.00 | 11.05 | 11.05 | 1.76 |

$f_w = C_w/2l = 44$ MHz for orthoferrites ($1 = 5\ \mu$). With the aid of the above Table it can be found that the maximum $f_{l,t}$ in the case of orthoferrites is 4 MHz. $f_w = C_w/21 = 440$ MHz for garnets ( $1 = 0.5\ \mu$m). By means of the above Table, it can be found that the maximum $f_{l,t}$ for garnets is 40 MHz.

For the selected example of a wafer of rare-earth orthoferrite a signal attenuation of 4 dB is attained over 0.3 mm. On the basis of the requirement that Q should be greater than 1, a minimum $f_l$ can be calculated which is 400 kHz and a minimum $f_t$ which is 100 kHz. For garnets the attenuation is a factor 10 greater, the lower limit for $f_l$ is 4 MHz and the lower limit for $f_t$ is 1 MHz.

It is to be noted that if standing waves are excited, another, radial vibration mode is of importance, characterized by oscillating ("breathing") of the "bubbles" under the influences of the modulation of the external field.

The resonant frequency of the radial vibration mode is expressed by $$f_r/f_w = 1/\eta\ \sqrt{2p/\pi sk \cdot 1/t \cdot \eta kk/4\pi M^2_s}$$

in which $\eta$ is the magnetic energy density of the "bubble" lattice.

The values calculated for $fr/f_w$ are also included in the above table.

The resonance frequency can be tuned by changing the field or the number of "bubbles" per unit of area. The limits of the frequency range are 350 and 800 kHz for orthoferrits and 3.5 and 8 MHz for garnets.

Figure 5:
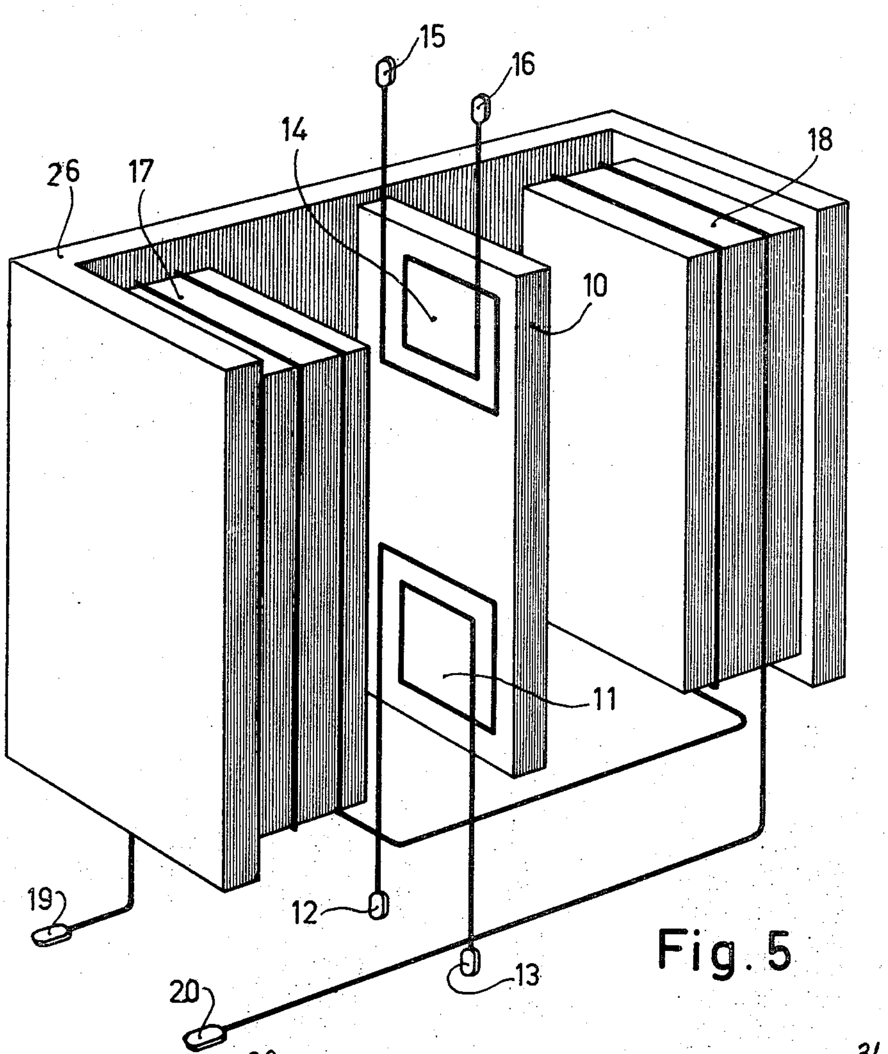
FIG. 5 shows a delay line according to the invention in a simplified form.

A simplified embodiment of a delay line according to the invention is shown in FIG. 5. A thin wafer of monocrystalline ferromagnetic material 10 in which cylindrical magnetic domains can be generated, is located between the poles 17 and 18 of a soft magnetic material of the permanent magnet 26. The material of wafer 10, which is preferably provided on a substrate, has an easy axis of magnetisation which is almost perpendicular to the plane of the wafer. The permanent magnet 26 produces a field whose direction is perpendicular to the plane of the wafer. The field strength can be varied by means of the winding provided on the pole-shoes 17 and 18. Via the connection terminals 19 and 20 this winding is connected to a current source. A flat winding 11 is vapour-deposited on one side of the wafer and is connected to the terminals 12 and 13, and a flat winding 14 is vapour-deposited on the other side and is connected to the terminals 15 and 16. A first method to produce a lattice of cylindrical domains in the wafer has already been described hereinbefore. A second method is to increase the bias field produced by the magnet 26 to such an extent that the material of the wafer 10 is saturated, and subsequently to reduce the bias field gradually, for which a field modulation should be available having an amplitude which is approximately 10% of the amplitude required to saturate the material and having a frequency of approximately 100 kHz.

An electrical signal applied to the terminals 12, 13 is converted by the electrical winding 11 into a magnetic field variation. Instead of an electrical winding it is alternatively possible to use other devices for converting an electrical signal into a magnetic signal, for example an open current loop or an aerial. Alternatively, it is possible to use converters which convert signals other than electrical signals, for example acoustic signals, into magnetic signals.

A magnetic field variation produced in the material may excite a longitudinal vibration of the "bubble" lattice and can be coupled out by the winding 14. The velocity of propagation of the excited vibration can be varied by changing the current through the winding on the pole-shoes 17 and 18 and thus the strength of the bias field. In this way an incoming signal is delayed to a greater or smaller extent so that the device according to FIG. 5 will function as a continuously variable delay line.

Figure 6:
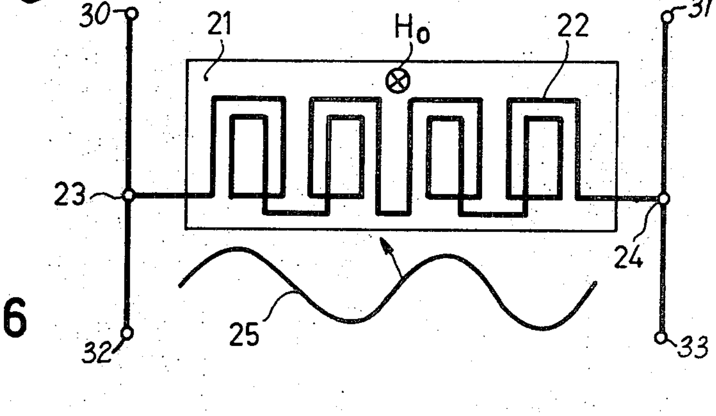
FIG. 6 shows a part of a frequency filter according to the invention in a simplified form.

With a minor modification such a device can also function as a frequency filter. To this end the wafer 10 should be replaced by the wafer 21 of FIG. 6 which also carries a "bubble" lattice. However, the input signal converter and the output signal converter are now combined. On the wafer 21 a pattern 22 of series-connected electrical windings are provided having terminals 23 and 24 with input terminals 30, 31 and output terminals 32, 33. The direction of each winding is always opposite to that of the previous winding or the next winding, respectively. Again it is possible to excite a vibration of the "bubble" lattice. Local density variations occur, represented by the curve 25. However, the wavelength is defined by the physical design of the wafer. The resonance frequency can be adjusted by changing the strength of the bias field.

What is claimed is:

1. A device for the processing of signals, comprising a central body of crystalline material, an input signal converter and an output signal converter, respectively, coupled to said body, and means for producing a uniform magnetic field of variable strength to act upon the central body, the body of crystalline material consisting of a wafer of magnetisable material with an easy axis of magnetisation which is substantially perpendicular to the plane of the wafer and a given direction of magnetization, said wafer having a periodic structure of cylindrical magnetic domains whose direction of magnetisation is opposite to the given direction of magnetisation of the rest of the wafer, the input signal converter converting an input signal into a magnetic signal and the output signal converter reconverting the magnetic signal into an output signal, and the means for producing a magnetic field to act upon the body producing a field of variable strength whose direction substantially coincides with the easy axis of magnetisation of the wafer material.

2. A device as claimed in claim 1, wherein the wafer of magnetisable material has dimensions for which a dimensional resonance frequency is imposed on the wave phenomena which can be produced in the periodic structure of cylindrical magnetic domains.

3. A device as claimed in claim 1, wherein the wafer of magnetisable material has dimensions for which a radial resonance frequency is imposed on the wave phenomena which can be produced in the periodic structure of cylindrical magnetic domains.

4. A device as claimed in claim 1, wherein the input signal converter and the output signal converter, respectively, convert electrical signals into magnetic signals and vice versa.

5. A device as claimed in claim 4, wherein at least one of the signal converters is a flat winding of electrically conductive material on the wafer of magnetisable material.

6. A device as claimed in claim 2, wherein the wafer is provided with a pattern of series-connected flat windings of electrically conductive material defining the periodicity of the wave phenomena.

7. A device as claimed in claim 6, wherein the ends of the pattern of windings are connected to two connection terminals each for a signal input and a signal output.

8. A device for processing signals, comprising a wafer-like body of crystalline, magnetisable material, said body having an easy axis of magnetisation substantially perpendicular to the plane of the wafer and having a periodic structure of cylindrical magnetic domains each magnetised in the direction opposite to the direction of magnetisation of the rest of the body, the device further comprising means for producing a magnetic signal in the body and means for producing a uniform magnetic field of variable strength to act upon the body, the direction of the field being substantially parallel to the said easy axis of magnetisation.

* * * * *

PO-1050 (5/69)

UNITED STATES PATENT OFFICE
CERTIFICATE OF CORRECTION

Patent No. 3,793,598 Dated February 19, 1974

Inventor(s) MAARTEN H.H. HOFELT ET AL

It is certified that error appears in the above-identified patent and that said Letters Patent are hereby corrected as shown below:

Column 3, line 65, "$1 = w/4\pi M^2$" should read --$1 = w/4M_s^2$ --;

Column 4, line 19, ($\lambda > D$) should read --($\lambda \gg D$)--;

line 49 "$Q = (K^2 \pi C) /f$" should read --$Q = (K^2 \rho C)^{\frac{1}{2}}/f$--;

Column 5, line 2, "q" should be --Q--;

line 63, "$= 1/n$" should read --$1/\pi$--.

Signed and sealed this 1st day of October 1974.

(SEAL)
Attest:

McCOY M. GIBSON JR.
Attesting Officer

C. MARSHALL DANN
Commissioner of Patents